US006974056B2

(12) United States Patent
Rea

(10) Patent No.: US 6,974,056 B2
(45) Date of Patent: Dec. 13, 2005

(54) CUP FOR MEASURING AND DISPENSING POWDERED PRODUCT

(75) Inventor: Keith Rea, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 106 days.

(21) Appl. No.: 10/625,313

(22) Filed: Jul. 23, 2003

(65) Prior Publication Data

US 2005/0017028 A1 Jan. 27, 2005

(51) Int. Cl.[7] .............................................. B65D 88/26
(52) U.S. Cl. ........................ 222/460; 222/461; 30/326; 73/426
(58) Field of Search ................................ 222/460, 461, 222/345, 346, 350, 353, 356; 141/108–109, 141/125, 280; 33/501.45; 30/326, 147–150; 73/426

(56) References Cited

U.S. PATENT DOCUMENTS 200,149 A * 2/1878 Neman ....................... 141/328
221,137 A 10/1879 Wright
382,870 A * 5/1888 Farrington ................... 73/426
544,398 A 8/1895 Ackerman
1,175,709 A * 3/1916 Cole ........................... 30/326
2,080,210 A * 5/1937 Mafra ......................... 73/426
D120,759 S 5/1940 Bryon
2,259,504 A 10/1941 Wilson et al.
2,569,179 A 9/1951 Lanchart
3,132,768 A 5/1964 Orr
3,603,358 A 9/1971 Mallindine
4,283,951 A 8/1981 Varpio
4,724,615 A 2/1988 Mackles et al.
5,662,249 A 9/1997 Grosse
5,884,523 A 3/1999 Cheng et al.
6,470,745 B1 10/2002 Reay et al.

OTHER PUBLICATIONS

European Search Report for European Application No. 004254347; Filed Jul. 21, 2004: Date of Completion Nov. 30, 2004.

* cited by examiner

*Primary Examiner*—Frederick C. Nicolas
(74) *Attorney, Agent, or Firm*—Alston & Bird LLP

(57) ABSTRACT

The present invention provides an improved apparatus for measuring and dispensing powdered products. The apparatus includes a cup portion and a funnel-shaped dispenser. The cup holds the powdered material to be measured is sized to contain a desired volume of the powder when filled to its upper edge. The upper edge of the cup has a flat surface to accommodate leveling of the powdered ingredients. The funnel-shaped dispenser serves as a leveler and aids in accurately dispensing the measured powder into a mixing area. The funnel-shaped dispenser thus defines a flat edge at its receiving opening for engaging the upper edge of the cup.

14 Claims, 1 Drawing Sheet

CUP FOR MEASURING AND DISPENSING POWDERED PRODUCT

FIELD OF THE INVENTION

The invention relates generally to the precise measurement of powdered ingredients as used in laboratory, cooking, or baking applications.

BACKGROUND OF THE INVENTION

Powdered or dry ingredients are used in a variety of applications throughout numerous industries. The practice of accurately measuring and dispensing powdered products requires two essential steps. First, a precise quantity of the powdered ingredient must be collected. Second, the measured powder must be precisely delivered to a mixing area or container without spillage. To accomplish the first step, often a "dry" measuring container, cup or scoop is used that is sized to have a given volumetric capacity when filled up to its top edge or rim. To ensure a proper measurement, the powdered ingredient is "leveled" with the top edge of the cup. This is typically done by overfilling the cup with the powdered ingredient and then running a flat blade over the top edge of the measuring cup, thereby leveling the powdered contents and ensuring the volume of powder matches the capacity of the cup. Dispensing the measured powder is often haphazardly conducted by placing the cup over a mixing area and simply inverting the cup. As a result, the powder is generally transferred to the mixing area; however, significant spillage or clumping of the powder often occurs. Additionally, dispensing a measured ingredient in this way does not accommodate a targeted transfer of the powder into containers having small entry openings such as baby bottles, or the like.

It is desirable then, to produce a measuring and dispensing apparatus that precisely measures powdered ingredients and accurately dispenses those ingredients even into containers having narrow openings. Further, it is desirable that the measuring and dispensing apparatus deposit the powdered ingredients into the container uniformly, so as to avoid clumping of the powder.

BRIEF SUMMARY OF THE INVENTION

The present invention addresses the above needs and achieves other advantages by providing an improved apparatus for measuring and dispensing powdered products. The apparatus includes a cup portion and funnel-shaped dispenser portion. The cup holds the powdered material to be measured and is sized to contain a desired volume of powder when filled to its upper edge. The upper edge of the cup has a flat surface to accommodate leveling of the powdered ingredients. The funnel-shaped dispenser has a flat edge at its receiving opening, and thus serves as a leveler when scraped across the cup. The dispenser also facilitates the accurate and uniform transfer of the measured powder into a mixing area. To support these dual functions, the flat edge at the dispenser's receiving opening is sized for engaging the upper edge of the cup so that the cup and dispenser can be abutted with substantially no gap between them.

To use the apparatus of the present invention, the cup portion is overfilled with a powdered ingredient. The funnel-shaped dispenser is then lowered over the overfilled mound of powdered material until the flat edge of the dispenser contacts the upper surface of the cup. When leveling, the dispenser is displaced laterally such that excess powder is removed and that which remains is level with the top surface of the cup portion, thereby producing an accurate measurement. Once a proper measurement of powdered material is obtained, the dispenser is replaced in concentric contact with the top surface of the cup. When dispensing, the apparatus is moved over the mixing area and is inverted. The measured contents are thereby transferred through the funnel-shaped dispenser to the mixing area. The present invention provides significant benefits to users including ensuring accurate measurement by eliminating spillage, reducing clumping, and facilitating the dispensing of powdered ingredients into narrow mixing containers.

In one preferred embodiment of the present invention, the cup portion and the funnel-shaped dispenser each have handle members. The handle members serve to aid in the use and manipulation of the cup/dispenser and are moveably joined to one another, such as by a pin, ring, or the like.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE PREFERRED EMBODIMENTS

The present invention now will be described more fully hereinafter with reference to the accompanying drawings, in which some but not all of the embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
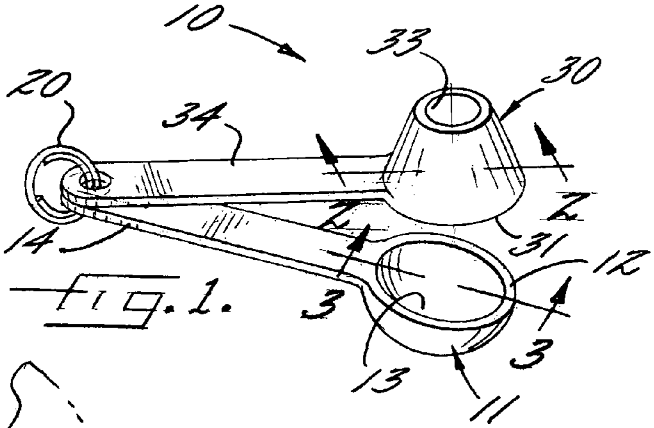
FIG. 1 is a perspective view of a measuring and dispensing apparatus in accordance with one embodiment of the present invention.

FIG. 1 illustrates one preferred embodiment of a measuring and dispensing apparatus 10 in accordance with the present invention, having a cup 11 and a funnel-shaped dispenser 30. Although optional, FIG. 1 depicts the cup 11 and funnel-shaped dispenser 30 as having handle members 14, 34. Such handle members support the convenient use and manipulation of the measuring and dispensing apparatus 10; however, such handles may be replaced with straps, springs, etc., or entirely omitted should the measuring and dispensing processes be automated. If handles are used, they may be connected to one another via a ring (as shown), pin or other similar connection apparatus 20.

Figure 2:
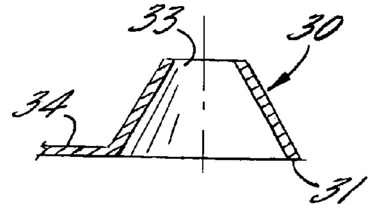
FIG. 2 is a section view of the funnel-shaped dispenser portion of the measuring and dispensing apparatus of FIG. 1 taken along section line 2—2.
Figure 3:
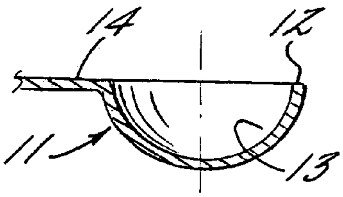
FIG. 3 is a section view of the cup portion of the measuring and dispensing apparatus of FIG. 1 taken along section line 3—3.

FIG. 2 provides a section view depicting the funnel-shaped dispenser 30, wherein the dispenser 30 has a relatively large receiving opening 35 and a relatively smaller exit opening 33. The perimeter of the receiving opening 35 defines a flat leveling surface 31. Opposing the flat leveling surface 31, is the flat upper edge 12 of the cup 11 as shown in FIG. 3. The flat leveling surface 31, and the flat upper edge 12 are sized and shaped to be abutted with one another with substantially no gap therebetween, such that no powder is allowed to escape when the receiving edges of the dispenser 30 and cup 11 are pressed together. Although depicted as semi-circular, the cup 11 may take various shapes (e.g., rectangular, square, triangular, etc.) so long as the cup 11 is ultimately capable of holding a given volume of powder. Additionally, though the flat upper edge 12 of the cup 11 is shown in FIG. 1 as generally oval in shape, it too may be of various shapes (e.g., rectangular, square, triangular, etc.) so long as the flat leveling surface 31 of the funnel-shaped dispenser 30 is shaped and sized to match as described above.

Figure 4:
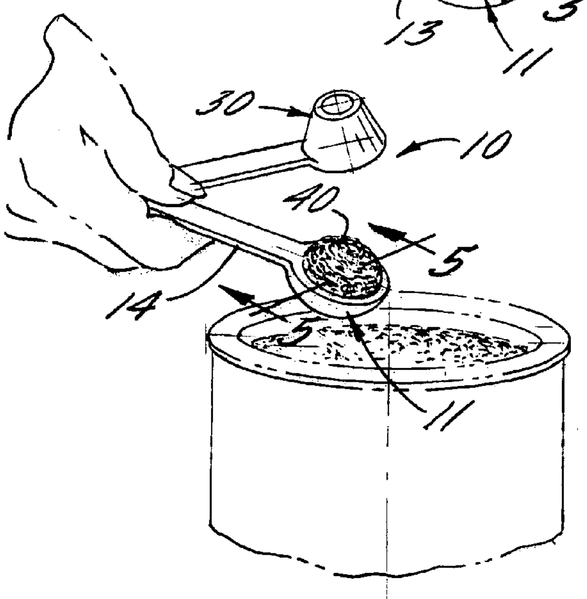
FIG. 4 is a perspective view of one embodiment of the measuring and dispensing apparatus of the present invention, illustrating the cup portion over-filled with a powdered ingredient.
Figure 5:
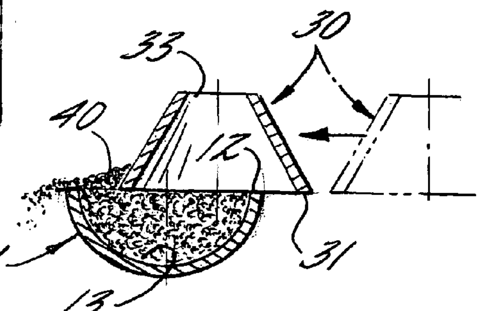
FIG. 5 is a section view illustrating the "leveling" or measuring of a powdered ingredient, wherein the funnel-shaped dispenser is translated laterally over the flat upper surface of the cup portion such that any excess powder is removed.
Figure 6:
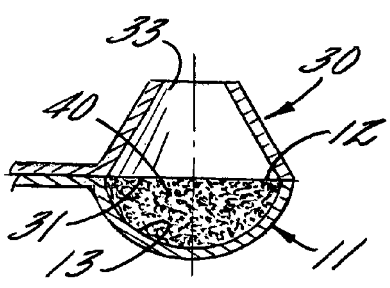
FIG. 6 is a section view of a measuring and dispensing apparatus in accordance with the present invention, illustrating the completion of the measuring process wherein the funnel-shaped dispenser is replaced in concentric contact with the cup.
Figure 7:
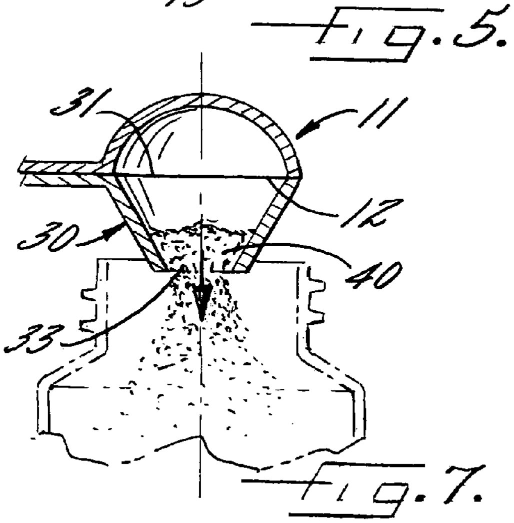
FIG. 7 is a section view illustrating the dispensing of a powdered ingredient, wherein the measuring and dispensing apparatus is inverted, thereby allowing the measured ingredient to flow through the funnel-shaped dispenser into a narrow mixing container.

FIGS. 4, 5, 6 and 7 illustrate the operation of one preferred embodiment of the present invention. Specifically, the cup 11 is over-filled with a powdered ingredient 40 as shown in FIG. 4. The powder is then "leveled" as shown in FIG. 5 by laterally translating the funnel-shaped dispenser 30 over the cup 11, such that the upper edge 12 of the cup 11 is maintained in intimate contact with the flat leveling surface 31 of the dispenser 30. Alternatively, the powder may be leveled by lowering the funnel-shaped dispenser 30 over the overfilled mound of powdered material 40 such that the flat leveling surface 31 of the dispenser 30 is placed in concentric contact with the upper surface 12 of the cup 11. The dispenser 30 may then be translated laterally as described above, such that any excess powder is removed. Once leveled, the funnel-shaped dispenser 30 is replaced in concentric contact with the cup 11 as shown in FIG. 6.

Finally, dispensing of the measured powder 40 occurs by inverting the measuring and dispensing apparatus 10, such that the measured powder 40 flows through the funnel-shaped dispenser 30. The relatively small exit opening 33 of the funnel-shaped dispenser 30 accommodates a uniform transfer of the powder, even into containers having narrow openings.

Many modifications and other embodiments of the invention set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for the purposes of limitation.

That which is claimed:

1. A measuring and dispensing apparatus comprising:

a cup for measuring a powder, the cup having a flat upper edge circumscribing a top opening of the cup;

a funnel-shaped dispenser for depositing the powder, the dispenser having a receiving opening and an exit opening that is relatively smaller in diameter than the top opening of the cup, wherein the perimeter of the receiving opening defines a flat leveling edge; and wherein the leveling edge of the dispenser is configured to be scraped across the upper edge of the cup to level a quantity of powder in the cup such that the powder is even with the upper edge of the cup, and wherein the leveling edge of the dispenser is configured to be concentrically abutted with the upper edge of the cup with substantially no gap therebetween, whereby inverting the measuring and dispensing apparatus causes the powder in the cup to flow out of the cup through the exit opening of the funnel-shaped dispenser.

2. A measuring and dispensing apparatus as recited in claim 1, wherein the cup is sized to contain a desired volume of powdered ingredients.

3. A measuring and dispensing apparatus as recited in claim 1, wherein the funnel-shaped dispenser is substantially conical.

4. A measuring and dispensing apparatus as recited in claim 1, wherein the cup and funnel-shaped dispenser each have handle members, and wherein the cup handle member is movably attached to the dispenser handle member by a connection apparatus.

5. A measuring and dispensing apparatus as recited in claim 4, wherein the connection apparatus is a pin.

6. A measuring and dispensing apparatus as recited in claim 4, wherein the connection apparatus is a ring.

7. A measuring and dispensing apparatus as recited in claim 1, wherein the funnel-shaped dispenser includes an interior surface defining an interior exit diameter proximate the exit opening and an interior receiving diameter proximate the receiving opening, and wherein the interior exit diameter is relatively smaller than the interior receiving diameter.

8. A measuring and dispensing apparatus as recited in claim 7, wherein the funnel-shaped dispenser includes an exterior surface defining an exterior exit diameter proximate the exit opening and an exterior receiving diameter proximate the receiving opening, and wherein the exterior exit diameter is relatively smaller than the exterior receiving diameter.

9. A measuring and dispensing apparatus comprising:

a cup for measuring a powder, the cup having a flat upper edge circumscribing a top opening of the cup and a cup handle rigidly affixed contiguous to the flat upper edge;

a funnel-shaped dispenser for depositing the powder, the dispenser having a receiving opening and an exit opening that is relatively smaller in diameter than the top opening of the cup, wherein the perimeter of the receiving opening defines a flat leveling edge and a dispenser handle is rigidly affixed contiguous to said leveling edge; and a connection apparatus for movably joining the dispenser handle to the cup handle so as to permit the leveling edge of the dispenser to be scraped across the upper edge of the cup to level a quantity of powder in the cup such that the powder is even with the upper edge of the cup, and wherein the leveling edge of the dispenser is configured to be concentrically abutted with the upper edge of the cup with substantially no gap therebetween, whereby inverting the measuring and dispensing apparatus causes the powder in the cup to flow out of the cup through the exit opening of the funnel-shaped dispenser.

10. A measuring and dispensing apparatus as recited in claim 9, wherein the connection apparatus is a pin.

11. A measuring and dispensing apparatus as recited in claim 9, wherein the connection apparatus is a ring.

12. A measuring and dispensing apparatus as recited in claim 9, wherein the cup is sized to contain a desired volume of powdered ingredients.

13. A measuring and dispensing apparatus as recited in claim 9, wherein the funnel-shaped dispenser includes an interior surface defining an interior exit diameter proximate the exit opening and an interior receiving diameter proximate the receiving opening, and wherein the interior exit diameter is relatively smaller than the interior receiving diameter.

14. A measuring and dispensing apparatus as recited in claim 13, wherein the funnel-shaped dispenser includes an exterior surface defining an exterior exit diameter proximate the exit opening and an exterior receiving diameter proximate the receiving opening, and wherein the exterior exit diameter is relatively smaller than the exterior receiving diameter.

* * * * *